UNITED STATES PATENT OFFICE.

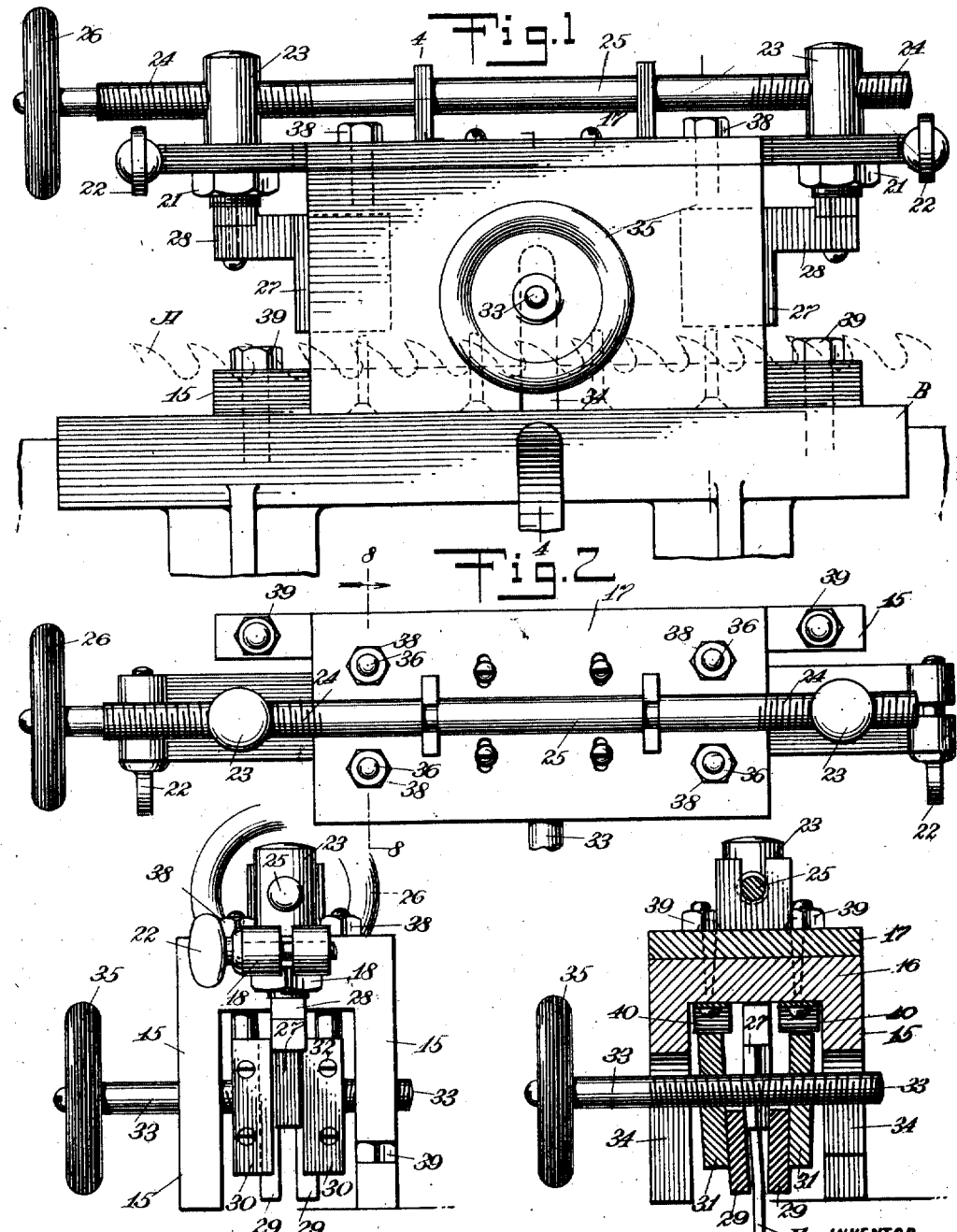

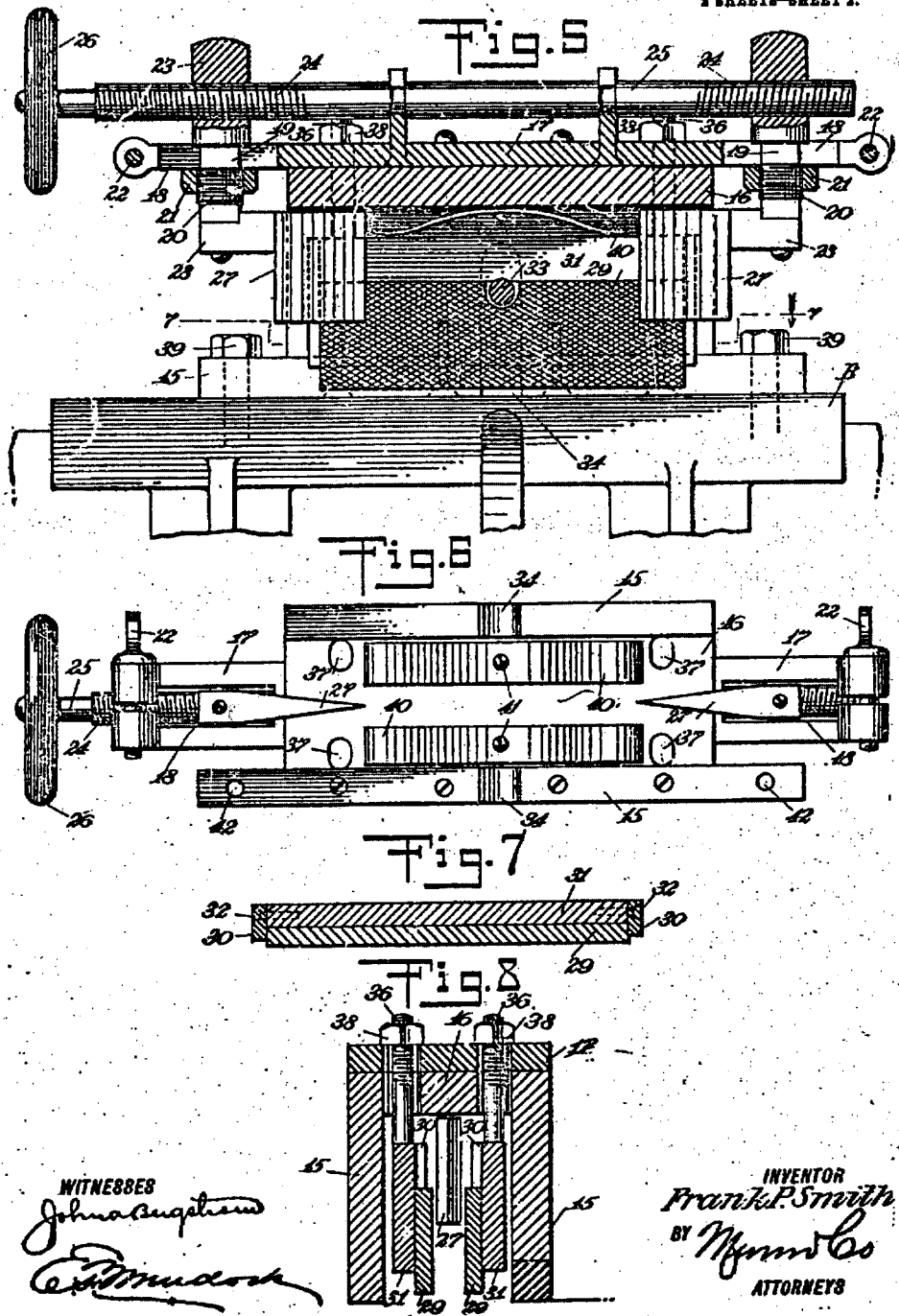

FRANK PHILLIPS SMITH, OF BAYPOINT, CALIFORNIA.

DRESSER FOR BAND-SAWS.

1,002,769.　　　　　Specification of Letters Patent.　　Patented Sept. 5, 1911.

Application filed February 27, 1911. Serial No. 611,165.

*To all whom it may concern:*

Be it known that I, FRANK PHILLIPS SMITH, a citizen of Canada, and a resident of Baypoint, in the county of Contra Costa and State of California, have invented a new and Improved Dresser for Band-Saws, of which the following is a full, clear, and exact description.

Among the principal objects which the present invention has in view are: To provide an attachment to the usual grinding machine, the operation of which results in removing the bur at the edge of the face of the teeth, and to reduce the teeth to the same spread; to provide means for dressing the sides of the teeth subsequent to grinding, and to accomplish the same automatically, and to shape the sides of the teeth to conform with the set thereof and to provide means for regulating the pitch and spread of the grinding members.

One embodiment of the present invention is disclosed in the structure illustrated in the accompanying drawings, in which like characters of reference denote corresponding parts in all the views, and in which—

Figure 1 is a side view of a dresser constructed and arranged in accordance with the present invention, the dotted lines in said figure indicating the teeth of the saw passing through the dresser; Fig. 2 is a top view of the same; Fig. 3 is an end view of the same; Fig. 4 is a vertical cross section taken on the line 4—4 in Fig. 1; Fig. 5 is a longitudinal vertical section taken on the median line of the dresser; Fig. 6 is a plan view from beneath, showing the under side of the top of the dresser frame and the wedges for spreading the dresser members; Fig. 7 is a longitudinal horizontal section taken on the line 7—7 in Fig. 5; and Fig. 8 is a vertical cross section taken on the line 8—8 in Fig. 2.

The dresser, as shown in the accompanying drawings, has a structural frame, the sides 15, 15 and the top 16 whereof are arranged to form an inverted open ended channel or box. Rigidly secured to the top is a bar 17, the ends whereof are bifurcated to form slots 18 in which slide eyelet bolts 19. The bolts 19 are provided with a threaded end 20 and a clamping nut 21. When the bolts 19 have been moved lengthwise of the slots 18 they are held in fixed position by setting up the nuts 21 and by turning up the wing bolts 22. The wing bolts 22 extend between the bifurcated ends of the bar 17, which form the slots 18, said bolts being thread engaged with one side of the bifurcated ends and loosely engaged with the other. The action of the bolts 22 is to clamp the bolts 19 in fixed position. The bolts 19 are provided with eyelet bosses 23 to receive the screw threaded portions 24 of a feed rod 25. The pitch of the two sections 24 is opposite, to move the bolts 19, 19 at the opposite ends of the bar 17 in opposite directions when the rod 25 is rotated by manipulating the handle 26. The rod 25 is thus rotated to converge and separate the wedges 27. The wedges 27 are mounted rigidly upon the bolts 19, 19, brackets 28 being provided therefor. The wedges 27 are provided to extend between the files 29. The files 29 are clamped by means of side strips 30 upon back plates 31. The strips 30 are held in position by means of screws 32. The plates 31 are perforated and tapped to receive a double pitched screw 33. The files, as shown best in Fig. 5 of the drawings, are recessed adjacent their upper edge to straddle the said screw 33. The sides 15, 15 are provided with vertical slots 34 to form guides for the said screw. The double pitched screw 33 is provided with a hand wheel 35. By manipulating the screw 33 the plates 31 are drawn toward each other moving in closer relation the files 29. In this manner the files are jammed against the sides of the saw A which is being sharpened. The plates 31 are provided with screw bolts 36, one at each end, extended through elongated eyelets 37 and provided with nuts 38 above the bar 17. By setting up the nuts 38 the plates 31 and files 29 carried thereon are raised above the guide bar B to which the dresser is bolted by means of bolts 39. The said plates are lowered by leaf springs 40. The springs 40 are held in position on the top 16 by means of screws 41.

The operation of a dresser constructed and arranged as herein shown and described is as follows: The saw A having been adjusted to the gummer or grinder and to the guide plate B, the dresser is placed above the same. In thus placing the dresser the wheel 35 is manipulated to open the plates 31 and files 29 until the same pass the set of the saw. The side 15 of the frame having the perforations 42 is then adjusted to register with perforations provided in the frame of the grinder to receive the bolts 39. The plates 31 are then adjusted vertically by manipulating the nuts 38, the plates being lowered until the top of the teeth of the saw is below the lower surface of the wedges 27. The wheel 35 is now manipulated to close the plates 31 and files 29 upon the saw A to bear hard against the side thereof. Prior to closing the plates 31 and files 29 carried thereby in the manner stated, the handle 26 is manipulated to adjust the wedges 27. The wedges 27 being interposed between the plates 31 at the upper section thereof rock the lower ends of the plates 31 and files carried thereby to form, as shown in Fig. 4 of the drawings, a downwardly converged or upwardly flared channel for the passage of the teeth of the saw. This flared surface accommodates the set of the teeth as formed by the gummer.

Having set the dresser the sharpening of the saw proceeds, no further attention being required for the dresser. When the treatment of the saw is complete the dresser is removed to permit the removal of the saw.

Having thus described my invention, what I claim as new and desire to secure by Letters Patent is:—

1. A dresser for band saws, comprising a pair of file plates adapted for adjustment on opposite sides of a saw; retractable clamping means for forcing said plates against said saw; wedge members insertible between said plates at the upper end thereof; and a double pitched screw operatively engaging said wedge members, the manipulation whereof inserts or retracts said wedge members between said plates.

2. A dresser for band saws, comprising a pair of file plates adapted for adjustment on opposite sides of a saw; retractable clamping means for forcing said plates against said saw; wedge members insertible between said plates at the upper end thereof; a double pitched screw operatively engaging said wedge members, the manipulation whereof inserts or retracts said wedge members between said plates; and means for locking said screw and said wedge members in adjusted position.

In testimony whereof I have signed my name to this specification in the presence of two subscribing witnesses.

FRANK PHILLIPS SMITH.

Witnesses:
C. J. SHIDELER,
A. H. ERICKSON.